United States Patent
Morgan et al.

(10) Patent No.: US 12,259,060 B2
(45) Date of Patent: Mar. 25, 2025

(54) MAGNETICALLY TUNABLE MICROFLUIDIC CHECK VALVE, MICROFLUIDIC PUMPS, SYRINGE PUMP, AND METHODS OF MANUFACTURING THEREOF

(71) Applicant: Dartmouth Ocean Technologies Inc., Dartmouth (CA)

(72) Inventors: Sean Christopher Morgan, Halifax (CA); Vincent Joseph Sieben, Bedford (CA); Edward Arthur Luy, Halifax (CA); Gregory Eric Begin, Enfield (CA)

(73) Assignee: Dartmouth Ocean Technologies Inc., Dartmouth (CA)

( * ) Notice: Subject to any disclaimer, the term of this patent is extended or adjusted under 35 U.S.C. 154(b) by 0 days.

(21) Appl. No.: 17/603,356

(22) PCT Filed: May 29, 2020

(86) PCT No.: PCT/CA2020/050739
§ 371 (c)(1),
(2) Date: Oct. 13, 2021

(87) PCT Pub. No.: WO2020/237390
PCT Pub. Date: Dec. 3, 2020

(65) Prior Publication Data
US 2024/0426391 A1    Dec. 26, 2024

Related U.S. Application Data

(60) Provisional application No. 62/854,621, filed on May 30, 2019.

(51) Int. Cl.
*F16K 31/08* (2006.01)
*B01L 3/00* (2006.01)
(Continued)

(52) U.S. Cl.
CPC ...... *F16K 31/084* (2013.01); *B01L 3/502738* (2013.01); *F16K 15/04* (2013.01); *F16K 15/1823* (2021.08)

(58) Field of Classification Search
CPC .... F16K 31/084; F16K 15/1823; F16K 15/04; B01L 3/502738
(Continued)

(56) References Cited

U.S. PATENT DOCUMENTS 4,197,875 A * 4/1980 Schieferstein .......... F16K 15/04
137/539
4,781,213 A * 11/1988 Kilayko ................ F16K 17/285
137/533.15
(Continued)

FOREIGN PATENT DOCUMENTS

CN    107975463 A    5/2018
JP    2018015721 A    2/2018

OTHER PUBLICATIONS

International Search Report & Written Opinion in PCT/CA2020/050739 dated Aug. 21, 2020, 14 pages.
(Continued)

*Primary Examiner* — Minh Q Le
(74) *Attorney, Agent, or Firm* — Tucker Ellis LLP (57) ABSTRACT

A ball-type check valve is disclosed that is passively sealed by an embedded permanent magnet and a gasket. The permanent magnet is used to increase the strength of the valve seal while still allowing forward flow, and a position of the magnet relative to the gasket allows for setting a cracking pressure that is required to overcome the magnetic force and open the valve. A microfluidic pumping system and a bi-directional microfluidic pump comprising the check-valve are also disclosed. Methods for manufacturing the check-valve and the bi-directional microfluidic pump in a microfluidic chip are disclosed. The present disclosure also
(Continued)

provides a syringe pump system that may be coupled to a microfluidic device for dispensing and withdrawing fluid into and from the device. The syringe pump system comprises a plurality of syringes and a mobile plate that is configured to actuate the syringes at different times.

22 Claims, 11 Drawing Sheets (51) Int. Cl.
*F16K 15/04* (2006.01)
*F16K 15/18* (2006.01)

(58) Field of Classification Search
USPC .................. 137/528; 417/143, 307, 311, 554
See application file for complete search history.

(56) References Cited

U.S. PATENT DOCUMENTS

| | | | | |
|---|---|---|---|---|
| 4,911,616 A * | 3/1990 | Laumann, Jr. | .......... | F04B 43/14 417/413.3 |
| 5,095,940 A * | 3/1992 | Saur | ........................ | F16K 24/02 236/34.5 |
| 5,167,495 A * | 12/1992 | Lebret | ..................... | F04B 49/24 417/490 |
| 5,472,323 A * | 12/1995 | Hirabayashi | .......... | F04B 53/126 310/35 |
| 6,554,591 B1 | 4/2003 | Dai et al. | | |
| 6,685,443 B2 * | 2/2004 | Simmons | ............ | F04B 43/0736 417/393 |
| 6,899,127 B1 * | 5/2005 | Swingley | ................ | F16K 15/04 137/533.15 |
| 6,921,253 B2 * | 7/2005 | Shuler | ..................... | F04B 43/08 417/571 |
| 7,610,930 B2 * | 11/2009 | Weaver | ................... | F16K 15/04 417/554 |
| 7,934,519 B2 * | 5/2011 | Zantl | ................. | B01L 3/502738 137/563 |
| 2003/0024571 A1 * | 2/2003 | Simmons | ................ | F16K 43/00 137/329.05 |
| 2006/0166184 A1 * | 7/2006 | Yasuda | ............. | B01L 3/502738 435/287.2 |
| 2008/0223463 A1 * | 9/2008 | Zantl | .................... | F16K 99/0001 137/597 |
| 2011/0049401 A1 * | 3/2011 | Chung | ................ | F16K 99/0001 29/890.131 |
| 2011/0095217 A1 * | 4/2011 | Schlenker | ............... | F16K 15/04 251/129.15 |
| 2014/0119952 A1 * | 5/2014 | Adachi | ................... | F04B 13/02 417/474 |
| 2015/0047721 A1 * | 2/2015 | Hayles | .................... | F16K 1/465 137/528 |
| 2017/0002951 A1 * | 1/2017 | Neuhaus | ............... | F16K 15/042 |
| 2017/0198833 A1 * | 7/2017 | Hiraoka | ................. | F16K 99/0023 |
| 2018/0094743 A1 * | 4/2018 | Hübner | .................. | B67C 11/04 |

OTHER PUBLICATIONS

Castillo-Leon, et al. "Lab-on-a-Chip Devices and Micro-Total Analysis Systems A Practical Guide." Oct. 9, 2015. 244 pages. https://www.researchgate.net/publication/281080765_Lab-on-a-Chip_Devices_and_Micro-Total_Analysis_Systems_A_Practical_Guide/link/56179ea608aee2517b9d340b/download.

* cited by examiner

//MAGNETICALLY TUNABLE
MICROFLUIDIC CHECK VALVE,
MICROFLUIDIC PUMPS, SYRINGE PUMP,
AND METHODS OF MANUFACTURING
THEREOF

CROSS-REFERENCE TO RELATED APPLICATIONS

This application claims the benefit of U.S. Provisional Patent Application No. 62/854,621, filed on May 30, 2019, the entire contents of which is incorporated by reference herein for all purposes.

TECHNICAL FIELD

The present disclosure relates to control devices and in particular to miniaturized fluid control devices.

BACKGROUND

With the ever increasing toll that humans exact on the world's oceans, the need for active, reliable and sustainable marine monitoring has never been higher. Nutrient levels are of particular concern as excessive nutrient levels in oceans leads to dangerous microbial growth rates, which can create eutrophic regions and potentially cause harmful algal blooms. Nitrogen, in the form of nitrite, nitrate, or ammonia, is one of the primary nutrients required for this growth. It is therefore necessary to come up with effective, economical, and low-power technologies for sensing total nitrogen levels at ocean depths. Lab-on-a-chip (LOC) systems present themselves as an attractive solution for all three requirements.

Lab-on-a-chip systems have been steadily gaining traction over the past few decades as an alternative to traditional fluid analysis methods. Microfluidic platforms use less power, reagent, and reaction time than their traditional counterparts. Furthermore, they have the potential to do measurements at high pressures, which has been useful for prolonged sensor deployment in ocean environments. However, to realize on-chip fluid control at the microfluidic scale, the development of specialized micro-valves and micro-pumps is required.

Accordingly, miniaturized fluid control devices and methods for manufacturing miniaturized fluid control devices remain highly desirable.

SUMMARY

In accordance with one aspect of the present disclosure, a check-valve is disclosed, comprising: a fluidic channel having an inlet end and an outlet end; a gasket disposed within the fluidic channel; a ferromagnetic metal ball adapted to engage with the gasket to seal against fluid flow when the valve is closed; and a permanent magnet disposed at a predetermined distance from the gasket, wherein, at the predetermined distance, the permanent magnet exerts a magnetic force on the metal ball that defines a minimum fluid pressure required to move the metal ball from the gasket to permit fluid flow.

In some aspects, the fluidic channel comprises a first portion within which the metal ball moves, and a second portion between the first portion and the outlet end, wherein a diameter of the second portion of the fluidic channel is smaller than a diameter of the metal ball.

In some aspects, the second portion is offset from a cylindrical axis of the first portion of the fluidic channel.

In some aspects, the metal ball is between 0.01-2.0 mm in diameter.

In some aspects, the metal ball is made of stainless steel.

In some aspects, the metal ball comprises an exterior surface coating.

In some aspects, the gasket is an O-ring.

In accordance with another aspect of the present disclosure, a microfluidic pumping system is disclosed, comprising: an inlet port for connecting a first fluid line to the microfluidic pumping system; an outlet port for connecting a second fluid line to the microfluidic pumping system; a syringe port for connecting a syringe to the microfluidic pumping system; a fluidic channel connecting the inlet port, the syringe port, and the outlet port in series; a first check-valve disposed in the fluidic channel between the inlet port and the syringe port; and a second check-valve disposed in the fluidic channel between the syringe port and the outlet port, wherein each of the first and second check-valves comprise: a valve fluidic channel having an inlet end and an outlet end coupled with the fluidic channel; a gasket disposed within the valve fluidic channel; a ferromagnetic metal ball adapted to engage with the gasket to seal against fluid flow when the valve is closed; and a permanent magnet disposed at a predetermined distance from the gasket.

In some aspects, in a dispensing state, fluid is pumped into the fluidic channel by the syringe via the syringe port causing the second check-valve to open while the first check-valve is closed, and fluid flows into the second fluid line via the outlet port.

In some aspects, in a withdrawal state, fluid is withdrawn from the fluidic channel by the syringe via the syringe port causing the first check-valve to open while the second check-valve is closed, and fluid flows from the first fluid line via the inlet port.

In some aspects, the valve fluidic channel comprises a first portion within which the metal ball moves, and a second portion between the first portion and the outlet end, wherein a diameter of the second portion of the fluidic channel is smaller than a diameter of the metal ball.

In some aspects, the second portion is offset from a cylindrical axis of the first portion of the fluidic channel.

In some aspects, the metal ball is between 0.01-2.0 mm in diameter.

In some aspects, the metal ball is made of stainless steel.

In some aspects, the metal ball comprises an exterior surface coating.

In some aspects, the gasket is an O-ring.

In accordance with another aspect of the present disclosure, a bi-directional microfluidic pump is disclosed, comprising: first and second fluidic inlet channels; first and second fluidic outlet channels; a fluidic actuation channel fluidically coupling the first and second fluidic inlet channels and the first and second fluidic outlet channels; a check-valve disposed in each of the first fluidic inlet channel, the first fluidic outlet channel, the second fluidic inlet channel, and the second fluidic outlet channel; and a permanent magnet disposed within the fluidic actuation channel and configured to move within a region of the fluidic actuation channel between a first side proximate to the first fluidic inlet and outlet channels and a second side proximate to the second fluidic inlet and outlet channels.

In some aspects, the permanent magnet is actuated within the fluidic actuation channel by an external magnetic field.

In some aspects, the external magnetic field is generated using at least one of a solenoid and a rotating permanent magnet.

In some aspects, the first and second fluidic outlet channels combine to a fluidic outlet port.

In some aspects, the check-valves comprise one or more of: a ball valve, a flap valve, a plug valve, a cantilever valve, and a geometric valve.

In some aspects, each check-valve comprises: a valve fluidic channel having an inlet end and an outlet end; a gasket disposed within the valve fluidic channel; and a ferromagnetic metal ball adapted to engage with the gasket to seal against fluid flow when the valve is closed In some aspects, the valve fluidic channel comprises a first portion within which the metal ball moves, and a second portion between the first portion and the outlet end, wherein a diameter of the second portion of the fluidic channel is smaller than a diameter of the metal ball.

In some aspects, the second portion is offset from a cylindrical axis of the first portion of the fluidic channel.

In some aspects, the metal ball is between 0.01-2.0 mm in diameter.

In some aspects, the metal ball is made of stainless steel.

In some aspects, the metal ball comprises an exterior surface coating.

In some aspects, the gasket is an O-ring.

In some aspects, the permanent magnet comprises a surface coating.

In accordance with another aspect of the present disclosure, a method of manufacturing a check-valve in a microfluidic chip is disclosed, comprising: cutting a fluidic channel into a layer of material to be bonded with one or more other layers of material for forming the microfluidic chip; placing a ferromagnetic metal ball into the fluidic channel; defining a groove in the fluidic channel for securing a gasket; placing the gasket into the groove; cutting a recess at a predetermined distance from the gasket for holding a permanent magnet; and inserting the permanent magnet into the recess.

In some aspects, the material is polymethyl(methacrylate) (PMMA).

In some aspects, the cutting is performed using a micromill or laser cutter.

In some aspects, the gasket is an O-ring.

In some aspects, the metal ball is made from stainless steel.

In some aspects, the microfluidic chip comprises at least three layers of material, and wherein the fluidic channel is cut into a middle layer.

In some aspects, the layers of material are solvent bonded using one or more of chloroform, heat, and pressure, to form the microfluidic chip.

In accordance with another aspect of the present disclosure, a method of manufacturing a bi-directional microfluidic pump is disclosed, comprising: cutting a plurality of fluidic channels into one or more layers of material to be bonded with one or more other layers of material for forming a microfluidic chip, the plurality of fluidic channels comprising first and second fluidic inlet channels, first and second fluidic outlet channels, and a fluidic actuation channel fluidically coupling the first and second fluidic inlet channels and the first and second fluidic outlet channels; installing a check-valve in each of the first and second fluidic inlet channels and the first and second fluidic outlet channels; and inserting a permanent magnet into the fluidic actuation channel.

In some aspects, the method further comprises disposing at least one of a solenoid and a rotating permanent magnet for generating a magnetic force to actuate the permanent magnet within the fluidic actuation channel.

In some aspects, the material is polymethyl(methacrylate) (PMMA).

In some aspects, the cutting is performed using a micromill or laser cutter.

In some aspects, the check-valve is a ball-type check valve, and installing the check-valve in each of the first and second fluidic inlet channels and the first and second fluidic outlet channels comprises: placing a ferromagnetic metal ball into each of the first and second fluidic inlet channels and the first and second fluidic outlet channels; defining a groove in each of the first and second fluidic inlet channels and the first and second fluidic outlet channels for securing a gasket; and placing the gasket into each of the grooves.

In some aspects, the gasket is an O-ring.

In some aspects, the metal ball is made from stainless steel.

In some aspects, the microfluidic chip comprises at least three layers of material, and wherein at least some of the plurality of fluidic channels are cut into a middle layer.

In some aspects, the layers of material are solvent bonded using one or more of chloroform, heat, and pressure, to form the microfluidic chip.

In accordance with another aspect of the present disclosure, a syringe pump system is disclosed, comprising: a plurality of syringes configured to be coupled to a microfluidic device, each syringe comprising a body portion, a plunger adapted to move within the body portion, and a plunger head coupled to the plunger and configured to be actuated for dispensing and withdrawing fluid from and into the body portion; and a mobile plate comprising a plurality of cavities, wherein the plunger head of each of the plurality of syringes is arranged within a respective cavity, and wherein a height of at least two cavities of the plurality of cavities within which the plunger heads can move are different.

In some aspects, the syringe pump system further comprises an actuation device configured to move the mobile plate upward and downward.

In some aspects, the actuation device comprises a stepper motor.

In some aspects, the syringe pump system further comprises a controller configured to control the actuation device.

In some aspects, the body portion of each of the plurality of syringes has a volume less than or equal to 5 mL.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

In accordance with the present disclosure, a ball-type check valve is disclosed that is passively sealed by an embedded permanent magnet and a gasket. The permanent magnet is used to increase the strength of the valve seal while still allowing forward flow, and the position of the magnet allows for setting a cracking pressure that is required to overcome the magnetic force and open the valve. The valve is further advantageous in that it exhibits very low leakage rates at high back pressures. A microfluidic pumping system and a bi-directional microfluidic pump that may comprise the check-valve are also disclosed. Methods for manufacturing the check-valve and the bi-directional microfluidic pump in a microfluidic chip are disclosed.

The present disclosure also provides a syringe pump system that may be coupled to a microfluidic device such as a microfluidic nutrient sensor for dispensing and withdrawing fluid into and from the device. The syringe pump system comprises a plurality of syringes and a mobile plate that is configured to actuate the syringes at different times.

Embodiments are described below, by way of example only, with reference to FIGS. 1-10. While the present disclosure may describe the microfluidic control devices with particular reference to integration with a microfluidic chip used for fluid analysis, a person skilled in the art will readily appreciate that the microfluidic control devices as disclosed herein are not necessarily limited to such applications and can be used in a broad range of devices that require fluid control.

Figure 1A:
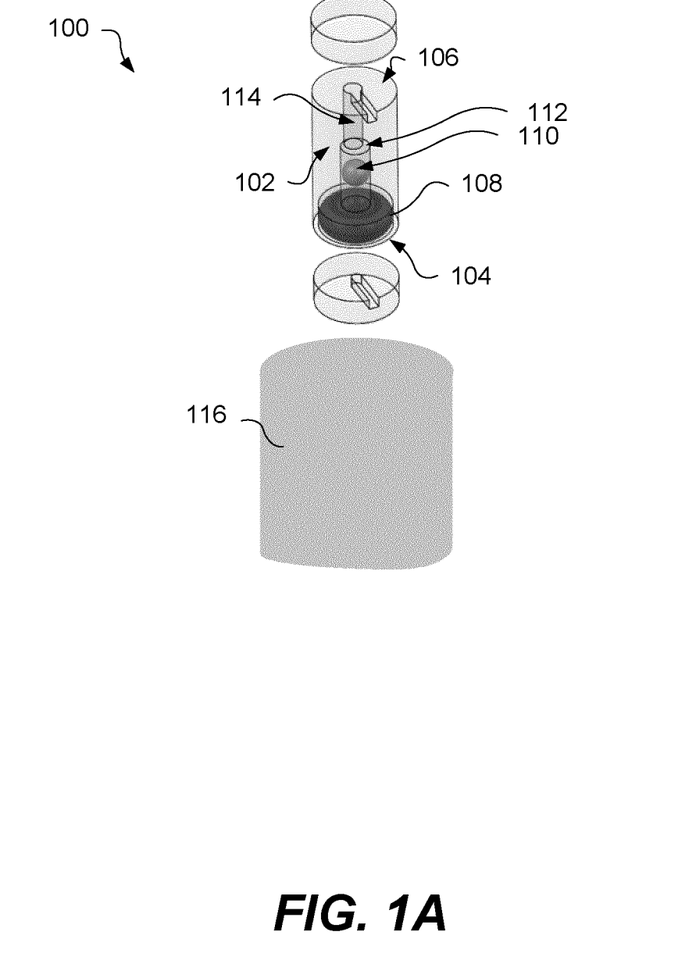
FIG. 1A shows a representation of a check-valve in accordance with some embodiments.
Figure 1B:
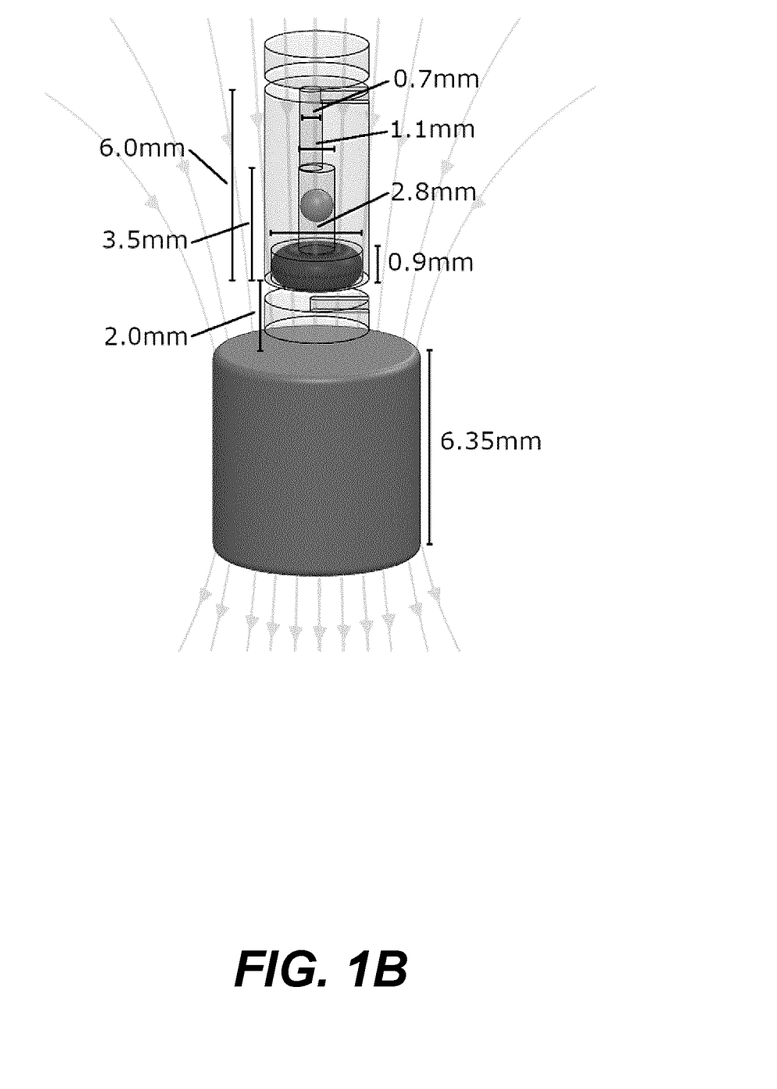
FIG. 1B shows example dimensions of the check-valve.

FIG. 1A shows a representation of a check-valve in accordance with some embodiments. FIG. 1B shows example dimensions of the check-valve. While FIG. 1B provides example dimensions for the valve design, it will be readily appreciated by a person skilled in the art that the valve is not limited to these dimensions and that actual dimensions may vary.

The check-valve 100 comprises a valve fluidic channel 102 having an inlet end 104 and an outlet end 106. In FIG. 1B, the fluidic channel 102 has a length between inlet end 104 and outlet end 106 of 6.0 mm. The fluidic channel 102 may be made of PMMA, which when bonded to itself is capable of withstanding high pressures without delaminating, which is advantageous for use of the valve at the bottom of the ocean. However, other common materials used in device fabrication; including, but not limited to: poly-carbonate (PC), poly-propylene (PP), poly-sulfone (PS, PSU, PSUL), Polyetherimide (PEI, Ultem), SU-8 photocurable epoxy, Norland optical epoxies, various laminates, fluorinated ethylene propylene (FEP) and cyclic olefin copolymer (COC), may be used. A gasket 108 is disposed within the fluidic channel 102, which in FIG. 1B is a 001 sized Viton O-ring. The gasket 108 is seated into a 0.9 mm deep slot and pressed between two layers of the channel material to create a seal. The check-valve 100 further comprises a ferromagnetic metal ball 110, which may for example be made of stainless steel, that engages with the O-ring 108 to seal against fluid flow in the fluidic channel between inlet end 104 and outlet end 106. The metal ball 110 may comprise an exterior surface coating that provides an inert protective layer, and which may for example comprise ceramic materials like $TiO_2$ or $ZrO_2$, or fluorinated polymers like Teflon or FEP, that enhance chemical compatibility. The metal ball may have a diameter ranging from 0.01-2.0 mm depending on application. In FIG. 1B, the metal ball 110 is 1 mm in diameter, and a first portion 112 of the fluidic channel 102 within which the metal ball 110 moves is larger than the diameter of the metal ball (in FIG. 1B, first portion 112 is 1.1 mm in diameter), allowing liquid to flow around the metal ball when the valve is open. Downstream of first portion 112 (i.e. between the first portion 112 and the outlet end 106), the fluidic channel 102 comprises a second portion 114 that is of smaller diameter than the metal ball 110. In FIG. 1B, the second portion 114 is 0.7 mm in diameter, and is positioned 3.5 mm from the inlet end 104. The second portion 114 is offset to a cylindrical axis of the first portion 112 of the fluidic channel 102 to ensure that the ball does not act as a plug when flow is going forward. When fluid flow opposes the direction of the valve, the steel ball 110 presses into the O-ring 108 to create a seal.

As shown in FIG. 1A, the check-valve 100 further comprises a permanent magnet 116 at a predetermined distance from the gasket 108, which in FIG. 1B is located at a distance of 2.0 mm beneath the gasket 108. In use as part of a microfluidic chip, the permanent magnet 116 may be embedded in PMMA or other material that the chip is made from. The permanent magnet 116 may for example be an N-40 grade cylindrical neodymium (NdFeB) permanent magnet, and in FIG. 1B the permanent magnet 116 is 6.00 mm in diameter and 6.35 mm in height, exerting a force of 0.0152 N on the ball, resulting in a calculated pressure of 19.41 kPA. This serves to keep the valve closed until a cracking pressure is overcome, which prevents back flow during periods of inactivity. Both finite elements method simulations and analytical calculations were used to determine the force on the steel ball. Approximating the ball to be a single magnetic dipole in comparison to the permanent magnet results in a force calculation of:

$$F(z) \sim -m(z) \frac{B_r R^2}{2} \left( \frac{\left((z-D)^2 - R^2\right)^{3/2} - \left(z^2 - R^2\right)^{3/2}}{\left(z^2 - R^2\right)^{3/2} \left((z-D)^2 - R^2\right)^{3/2}} \right) \quad (1)$$

where R and D are the radius and height of the cylindrical magnet, Br is the remanence field of the permanent magnet, and m (z) is the magnetic moment of the ball at height z above the surface of magnet.

The valve 100 was characterized in both forward and reverse directions, and found to have very low leakage rates and cracking pressures in agreement with calculations. A 26PC Honeywell in-line differential pressure gauge was used for all pressure measurements, and a National Instruments USB-6009 DAQ, in conjunction with Lab-View, was used for data acquisition. The reported range of the sensor is ±100 mV, which corresponds to ±100 psi. The resolution and offset of the gauge were measured by taking the root mean square (RMS) of a blank reading at 1000 Hz. All subsequent measurements were taken at a sampling rate of 1000 Hz, with the measured pressure offset taken into account. Furthermore, the range on the DAQ was set to ±500 mV, which meant the bit resolution of the analog to digital conversion was well within the error of the noise. FIGS. 2a-f show plots characterizing the check-valve.

Figure 2:
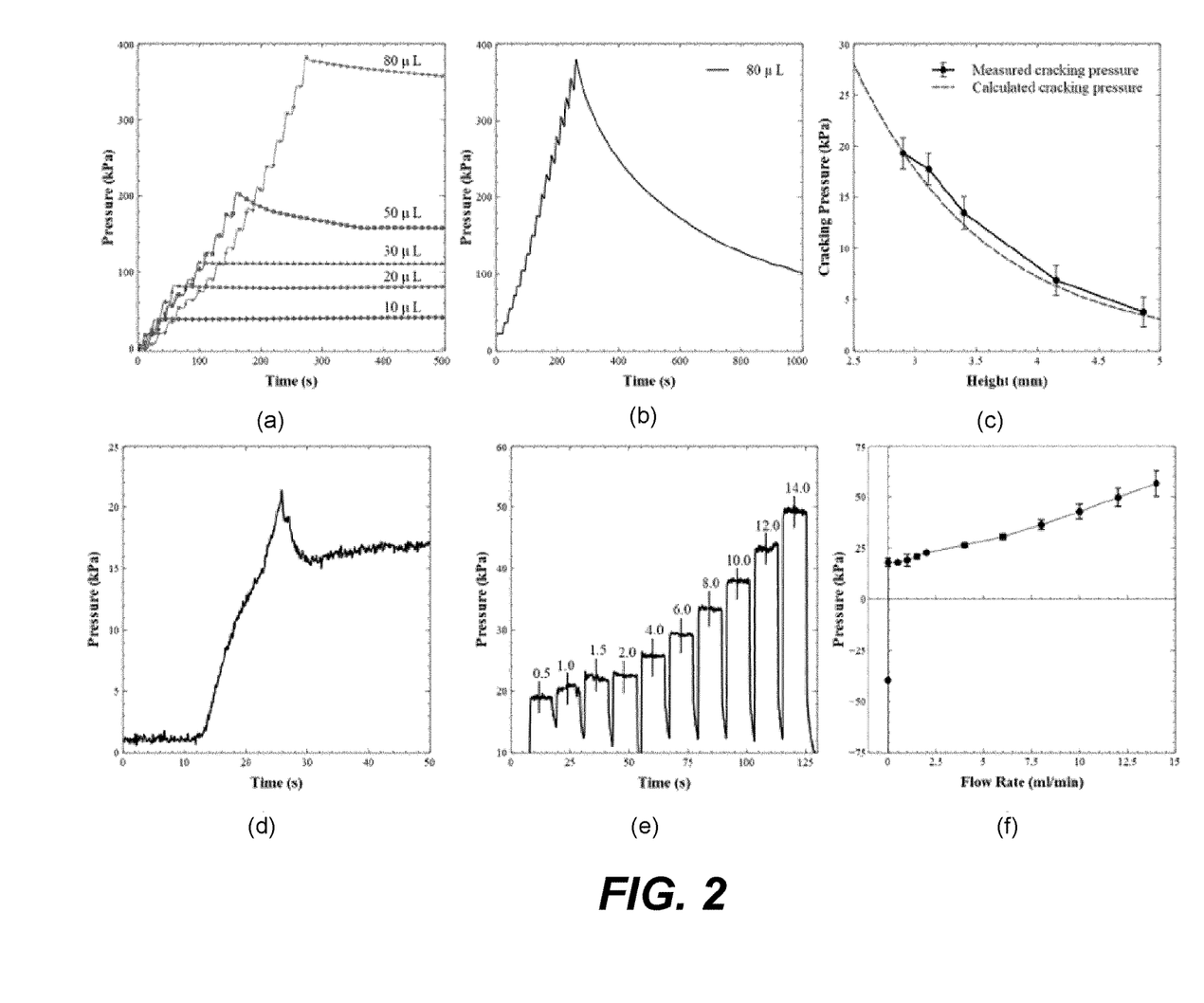
FIGS. 2a-f show plots characterizing the check-valve.

FIG. 2(a) shows a plot of fluid pressure vs. time while fluid is injected backwards into the valve in 5 μL increments to several pre-defined volumes of 10, 20, 30, 50, and 80 μL. The rate of back leakage was determined by monitoring pressure decrease over time with a dead-end pressure test. Water was pumped backwards into the valve in 5 μL increments until a target volume was reached. FIG. 2A shows how the pressure increases with each 5 μL step. The rate of pressure decrease could then be used to determine the fluid leakage rate using the pressure to volume ratio of the step-wise increases. Back flow leakage rates were calculated using back pressure measurements. A bench top Tecan syringe pump was used to inject 5 μL volumes of water backwards into the valve in a step-like fashion. The subsequent increases in pressure were recorded and used to determine a pressure to volume ratio, which were then used to calculate the back leakage rate over a 20 minute window. The data was collected as 1 second averages of the 1000 Hz sampling rate. This process was repeated for 5 different pressures, up to around 400 kPa. So long as the back pressure remained below ~150 kPa, the fluid leakage rate was small enough to be negligible (<0.4 μL/min). At ~350 kPa, the leakage rate was still moderately small at <2 μL/min. FIG. 2(b) shows a comparative scenario of a failed valve, wherein almost all of the fluid leaked over the 20 minute window when injected backwards into the valve.

FIG. 2(c) shows measured and calculated cracking pressure of the valve with the permanent magnet placed at varying distances (height) from the gasket/steel ball. FIG. 2(d) shows a plot of pressure vs. time for a sample valve. In the test represented by FIG. 2(d), fluid was injected forwards into valve at 0.05 ml/min, while a pressure gauge continually monitored the fluid pressure. The pressure increased as fluid was added until a point where it overcomes the force on the steel ball from the permanent magnet and the seal cracks (i.e. the steel ball is displaced from the gasket). The pressure then drops off as the seal is cracked and the ball is forced further from the magnet. The fluid required to keep the ball at the top of the first portion of the fluidic channel is less than is needed to crack the seal because the magnetic force on the ball decreases quadratically as the ball moves further away. This test process was repeated with five different magnetic field strengths to show tunability by using a permanent magnet positioned at different distances from gasket of the check-valve. A Tecan syringe pump was used to inject water forward into the valve at set rates. This measurement is done as 0.1 second averages of the 1000 Hz sampling rate. The syringe pump was programmed to inject for 10 seconds at each set flow rate (see FIG. 2(e)). The pressure at these set rates is averaged, and the standard deviation is measured for error. A characterization curve (FIG. 2(f)) was made using both forwards and backwards pressure measurements. The displayed error is the standard deviation from the results of the same tests performed on 6 different test valves. From this curve, the cracking behaviour of the valves is clearly displayed.

The behaviour of the pressures at low flow rates confirms that these valves are suitable for use in microfluidic micropumps. The ball remains close to the gasket at low flow rates, enabling a potentially high sealing frequency with low back leakage. If the ball remains close to the gasket at low flow rates, it will not take much time to re-seal when withdrawing and crack when dispensing, so long as the fluid pressure remains near the cracking pressure. This cracking pressure can be tuned by increasing or decreasing the distance between the ball and the magnet.

Figure 3A:
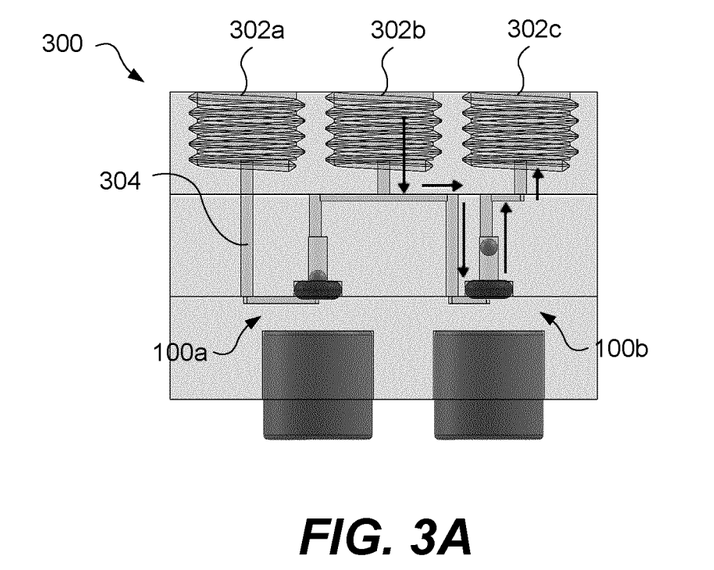
FIGS. 3A and 3B show a representation of a two-valve microfluidic pumping system for withdrawing fluid from one source and dispensing to another.
Figure 3B:
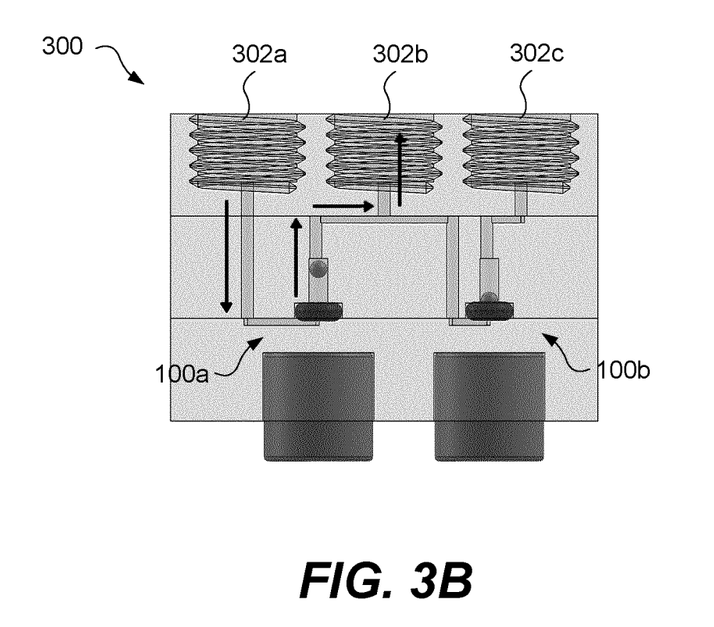

FIGS. 3A and 3B show a representation of a two-valve microfluidic pumping system 300 for withdrawing fluid from one source and dispensing fluid to another. The system 300 comprises three ports 302a-c each connected in series by a fluidic channel 304. Two check-valves 100a and 100b, which each correspond to the check-valve 100 described with reference to FIG. 1, are respectively disposed along the fluidic channel 304 between a first port 302a and a second port 302b, and between the second port 302b and a third port 302c. Note that while the check-valves 100a and 100b are shown in FIGS. 3A and 3B as each comprising a respective permanent magnet, in some embodiments a single permanent magnet may be employed for exerting a magnetic force on both check-valves.

In use, a syringe (not shown) may screw into the threads of the center port 302b while fluid lines (not shown) may screw into the outer two ports 302a and 302c. FIG. 3A depicts a state of the system 300 when the syringe is dispensing fluid into the fluidic channel 304 via the second port 302b. The first check-valve 100a remains closed, while the second check-valve 100b opens when the fluid pressure overcomes the cracking pressure of the valve and fluid is dispensed into the fluid line connected through the third port 302c. FIG. 3B depicts a state of the system 300 when the syringe is withdrawing fluid from the fluidic channel via the second port 302b. The first check-valve 100a is opened as the fluid pressure exceeds the cracking pressure and fluid is withdrawn from the fluid line connected through the first port 302a, while the second check-valve 100b remains closed.

Figure 4A:
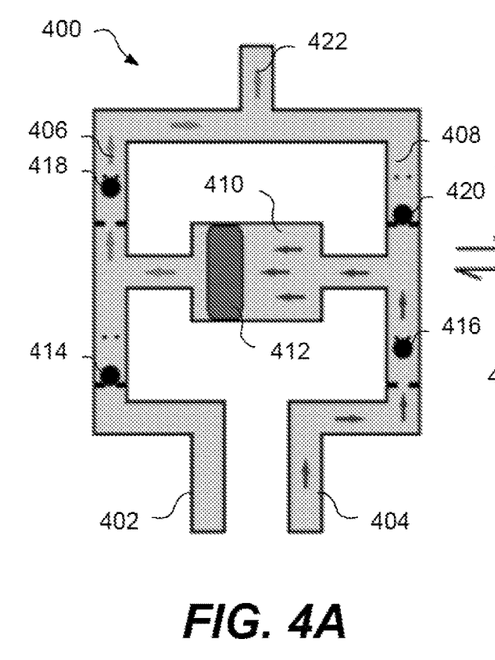
FIGS. 4A and 4B show a representation of a bi-directional microfluidic pump.
Figure 4B:
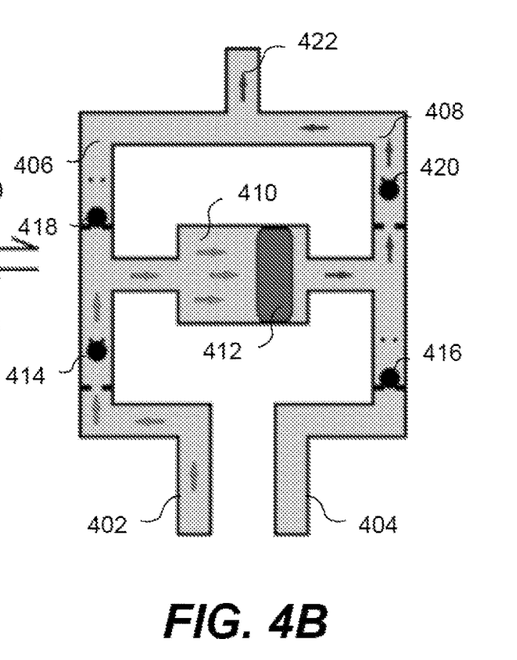

FIGS. 4A and 4B show a representation of a bi-directional microfluidic pump 400. The bi-directional microfluidic pump 400 comprises first and second fluidic inlet channels 402, 404, first and second fluidic outlet channels 406, 408, and a fluid actuation channel 410. The fluid actuation channel 410 fluidically couples the first and second fluidic inlet channels 402, 404 and the first and second fluidic outlet channels 406, 408. A permanent magnet 412, such as a NdFeB permanent magnet, is disposed within the fluid actuation channel 410 and is configured to move within the fluid actuation channel 410 when acted upon by an external magnetic force such as created by a rotating magnet or a electromagnetic coil solenoid (not shown). The permanent magnet thus acts as a piston to displace fluid between the first/second inlet/outlet channels 402, 404, 406, and 408. The permanent magnet may be coated to enhance chemical compatibility and provide other benefits including reduced wear/longer life and lower friction/energy per actuation or stroke. The coating may for example be polymers like Teflon/FEP/viton/rubber/silicone or ceramics like Titanium dioxide or Zirconium dioxide (zirconia), Titanium nitride, titanium carbide, etc.

Each of the first fluidic inlet channel 402, second fluidic inlet channel 404, first fluidic outlet channel 406, and second fluidic outlet channel 408, respectively comprise a check-valve. In FIGS. 4A and 4B, a ball-type check-valve (check-valves 414, 416, 418, and 420, respectively) is shown, although different types of integrated microfluidic check valves, such as flap valves, plug valves, cantilever valves, geometric valves, etc. could be used instead. Where a ball-type check-valve is used, the check-valves 414, 416, 418, and 420 may be similar to the check-valve depicted in FIG. 1 but without a respective permanent magnet associated therewith. In some implementations, the bi-directional pump may be configured such that the permanent magnet does not magnetically interact with the respective check-valves. However, in other implementations of the bi-directional microfluidic pump 400 the permanent magnet may exert a force that acts on the ferromagnetic metal balls of each of the check-valves 414, 416, 418, and 420

In this manner, in one embodiment actuation of the permanent magnet 412 within the fluidic actuation channel 410 affected by an external force may change a cracking pressure in the respective check-valves 414, 416, 418, and 420 and controls a flow of fluid being withdrawn into the first or second fluidic inlet channels 402, 404 and dispensed out of the first or second fluidic outlet channels 406, 408. FIG. 4A depicts a state where the permanent magnet 412 is actuated to a left side of the fluidic actuation channel 410 toward the first fluidic inlet and outlet channels 402, 406, causing fluid to be dispensed through the first fluidic outlet channel 406 and withdrawn through the second fluidic inlet channel 404. The displacement of fluid towards the first fluidic outlet channel 406 is sufficient to increase the fluid pressure to overcome the cracking pressure of the check-valve 418, while the actuation of the permanent magnet 412 away from the second inlet channel 404 may lower a cracking pressure of the check-valve 416 and results in the fluid being drawn into the system. FIG. 4B depicts a state where the permanent magnet 412 is actuated to a right side of the fluidic actuation channel 410 towards the second fluidic inlet and outlet channels 404, 408, causing fluid to be dispensed through the second fluidic outlet channel 408 and withdrawn through the first fluidic inlet channel 402. The permanent magnet can thus be actuated between first and second sides of the fluidic actuation channel 410, and when fluid is displaced and dispensed through one of the first or second fluidic outlet channels 406, 408, fluid is drawn into the system via an alternate fluidic inlet channel 402, 404 (i.e. when fluid is dispensed through the first fluidic outlet channel 406 it is drawn into the system via the second fluidic inlet channel 404, and vice versa). The first and second fluidic outlet channels 406, 408 may be combined to a single outlet port 422 for combining two inlet flows through the first and second fluidic inlet channels 402, 404.

Figure 5:
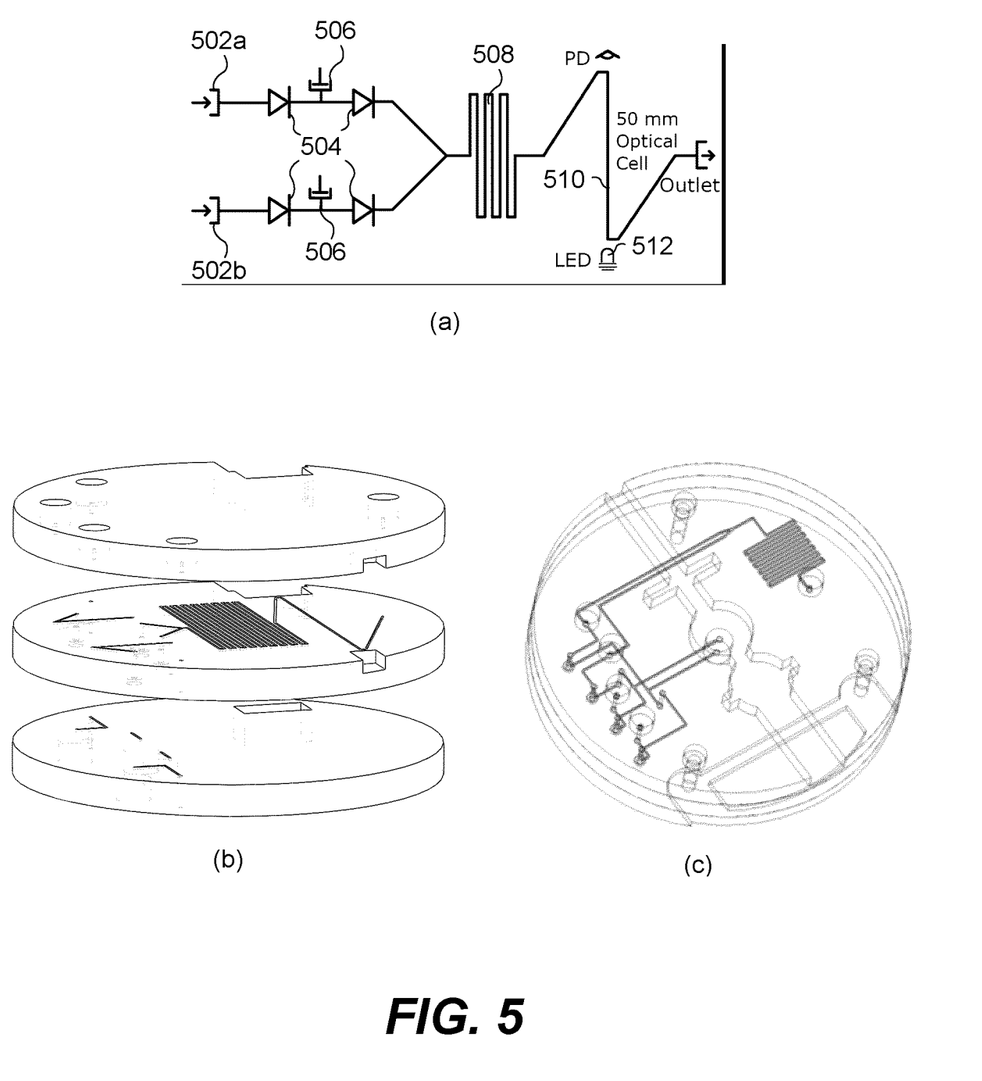
FIGS. 5A-C show example integration of microfluidic control devices with a microfluidic chip.

The check-valve 100, the microfluidic system 300, and the bi-directional microfluidic pump 400, may be integrated into a microfluidic chip to enable analyzing a fluid. FIGS. 5A-C show example integration of microfluidic control devices with a microfluidic chip. In particular, FIG. 5A shows a flow schematic of an example microfluidic chip, FIG. 5B shows an exploded view of a microfluidic chip, and FIG. 5C shows an assembled perspective view of a microfluidic chip.

As depicted in FIG. 5A, fluid is withdrawn from two inlets 502a, 502b (e.g. sample inlet and a reagent inlet), and mixed in a serpentine channel 508. In the example schematic depicted in FIG. 5A, two check-valves 504 are disposed in respective channels between each of the inlets 502a, 502b and the serpentine channel 508, and a syringe 506 is disposed between the two check-valves, thus providing a microfluidic system similar to that described with reference to FIGS. 3A and 3B. A person skilled in the art will also readily appreciate that instead of or in addition to the microfluidic system, the microfluidic chip may use a bi-directional pump similar to that described with reference to FIGS. 4A and 4B. A controller (not shown) may be used to control and coordinate all of the microfluidic control devices. After mixing, the fluid may be analyzed by an optical cell 510 that enables light spectroscopy using probe light by a light source such as LED light 512 to analyze the fluid.

As depicted in FIGS. 5B and 5C, the microfluidic chip may be manufactured from several layers of material (e.g. PMMA or others), and the microfluidic control devices may be integrated into one of the layers (typically a middle layer) of a microfluidic chip during assembly. The microfluidic chip may also provide an area for an external solenoid and/or rotating magnet, when employing the bi-directional microfluidic pump.

The valve disclosed herein is designed to be integrated into microfluidic devices for the purpose of marine sensing, but a person skilled in the art will readily appreciate that the check-valve and microfluidic control devices have applicability well beyond that. In any microfluidic device that requires fluid control mechanisms, a no-power, robust valve could be very impactful. Furthermore, it has potential to be turned into an embedded micro-pump if a solenoid is employed to pulse on and off, causing the ball to simulate a syringe withdrawing and dispensing. Regardless, the valve design is simple, cheap and adaptable to almost any microfluidic system.

Figure 6:
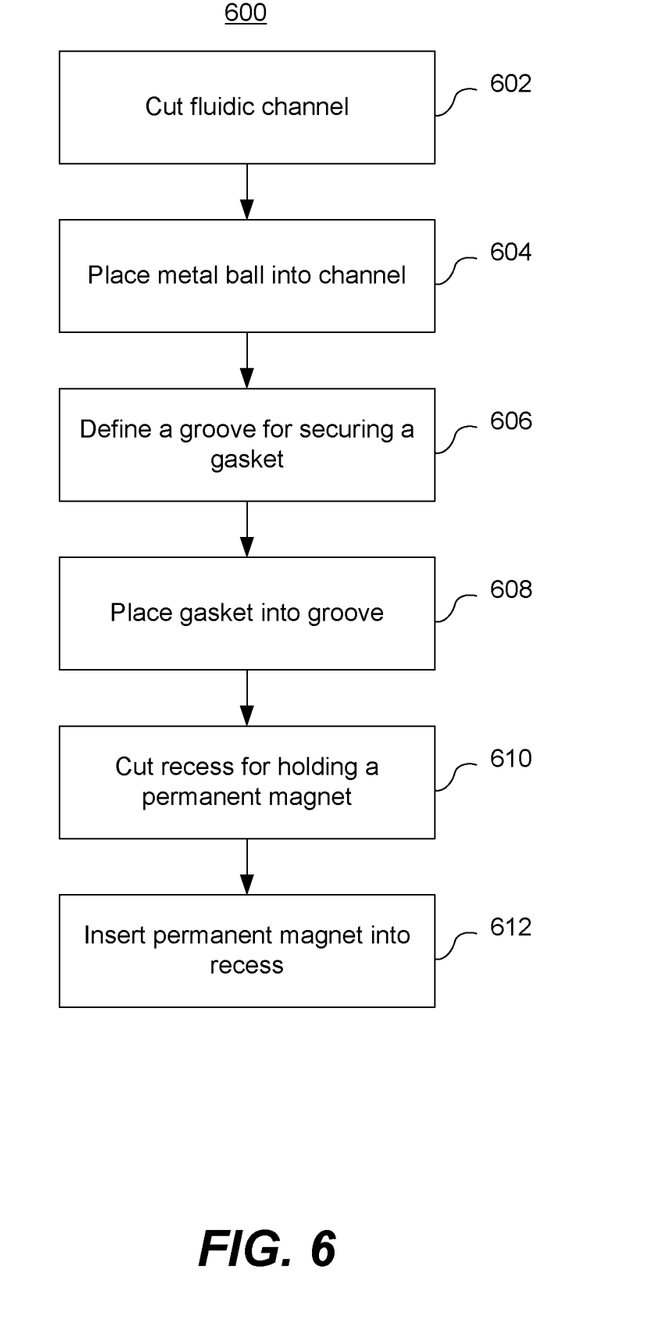
FIG. 6 shows a method of manufacturing a check-valve.

FIG. 6 shows a method 600 of manufacturing a check-valve in a microfluidic chip. A fluidic channel for the valve is cut into a layer of material such as PMMA or other type of material such as those listed above, which may later be bonded with one or more other layers of material for forming the microfluidic chip (602). For example, the microfluidic chip may be formed from multiple layers of PMMA that are solvent bonded using one or more of chloroform, heat, and pressure, and the fluidic channel may be cut into a middle layer prior to the solvent bonding. The fluidic channel may be cut to define first and second portions of differing diameters as described with reference to FIG. 1. A ferromagnetic metal ball, such as a stainless steel ball, is placed into the fluidic channel (604). A groove is defined in the fluidic channel for securing a gasket (606). A gasket, such as an O-ring, is placed into the groove, and adapted for forming a seal with the metal ball when the metal ball engages with the gasket (608). A recess is cut for holding a permanent magnet at a predetermined distance from the gasket (610). The recess for holding the permanent magnet may for example be cut in a different layer of material than the fluidic channel. As previously described, the distance between the permanent magnet and the gasket may be set to define a cracking pressure for the valve. The permanent magnet is inserted into the recess (612).

Cutting may be performed using a machine such as a LPKF S103 Micromill, for example. To form the microfluidic chip, chloroform exposure may be performed, and the layers pressed together in a machine such as an LPKF Multipress II at 85° C. for a length of time such as 2 hours to ensure a solid bond.

Figure 7:
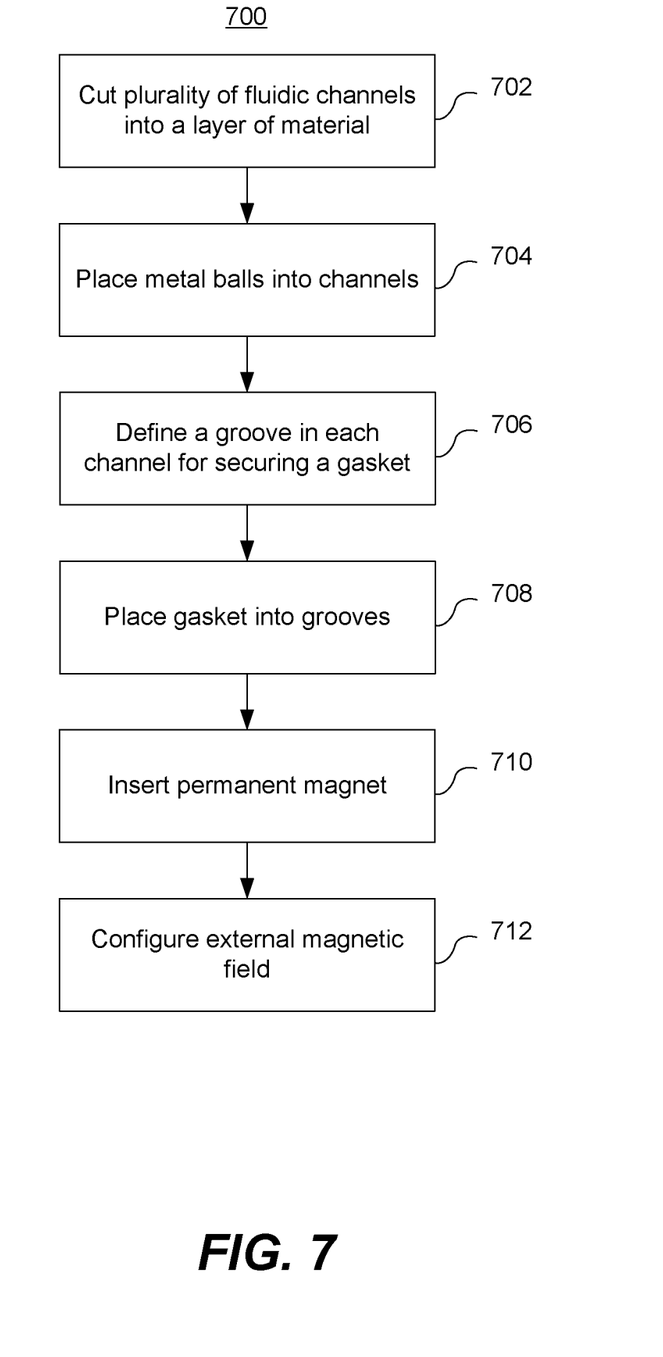
FIG. 7 shows a method of manufacturing a bi-directional microfluidic pump.

FIG. 7 shows a method 700 of manufacturing a bi-directional microfluidic pump such as that shown in FIGS. 4A and 4B. A plurality of fluidic channels are cut into one or more layers of material, which may later be bonded with one or more other layers of material for forming the microfluidic chip (702). The plurality of fluidic channels comprise first and second fluidic inlet channels, first and second fluidic outlet channels, and a fluidic actuation channel fluidically coupling the first and second fluidic inlet channels and the first and second fluidic outlet channels. The microfluidic chip may be formed from multiple layers of PMMA that are solvent bonded using one or more of chloroform, heat, and pressure, and the fluidic channels may be cut into one or more layers prior to the solvent bonding. Cutting the fluidic channels may comprise cutting recesses into two different layers of material that when bonded together form a channel.

A check-valve is installed in each of the of the first and second fluidic inlet channels and the first and second fluidic outlet channels. If a ball-type check-valve is used, such as that as described with reference to FIG. 1, a ferromagnetic metal ball, such as a stainless steel ball, is placed into each of the first and second fluidic inlet channels and the first and second fluidic outlet channels (704). A groove is defined in each of the first and second fluidic inlet channels and the first and second fluidic outlet channels for securing a gasket (706). The gasket, such as an O-ring, is placed into each of the grooves, and is adapted for forming a seal with the metal ball when the metal ball engages with the gasket (708). If a check-valve other than the ball-type check-valve is used, such as a flap valve for example, suitable steps for installing that type of check-valve may be performed instead. A permanent magnet is inserted into the fluidic actuation channel (710), which may for example comprise inserting the permanent magnet into a recess of one layer of material that when bonded with an adjacent layer of material forms the fluidic actuation channel. An external magnetic field for generating a magnetic force to actuate the permanent magnet within the fluidic actuation channel is configured by disposing at least one of a solenoid or rotating permanent magnet on the microfluidic chip (712).

Cutting may be performed using a machine such as a LPKF S103 Micromill. To form the microfluidic chip, chloroform exposure may be performed, and the layers pressed together in a machine such as an LPKF Multipress II at 85° C. for 2 hours to ensure a solid bond.

Figure 8:
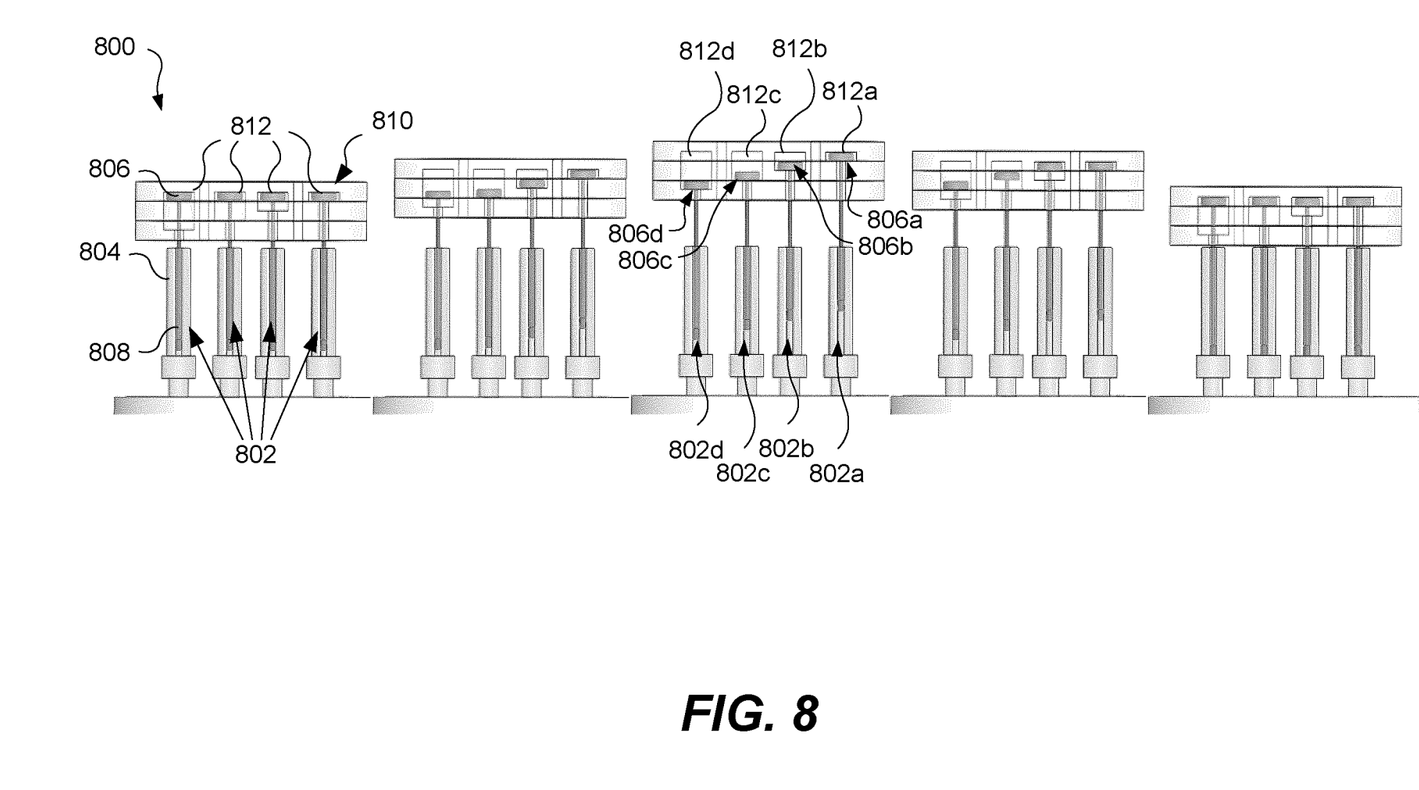
FIG. 8 shows a representation of a syringe pump system.

FIG. 8 shows a representation of a syringe pump system. The syringe pump system 800 may be used for dispensing and withdrawing fluid into a microfluidic system such as part of a microfluidic chip as described herein, wherein the microfluidic check-valves may be used to control the direction of fluid flow into and out of the syringes. The syringe pump system 800 comprises a plurality of syringes 802 (in FIG. 8, four syringes 802a-d) that are configured to be coupled to a microfluidic device. Each syringe 802 comprises a body portion 804 and a plunger head 806 coupled to a plunger 808 that is adapted to move within the body portion 804. The body portion 804 is configured to hold fluid, and may for example have a volume of less than or equal to 5 mL. The plunger head 806 is actuatable and configured to dispense and withdraw fluid from and into the body portion 804 via the plunger 808.

The syringe pump system 800 further comprises a mobile plate 810 comprising a plurality of cavities 812. The plunger head 806 of each of the syringes 802 is arranged within a respective cavity 812, and is configured to move up and down within the cavity. In the design of the mobile plate 810, at least two of the cavities 812 have different heights (in FIG. 8, all of the cavities 812 have different heights), and therefore actuation of the plunger heads 806 occurs at different times as the mobile plate is moved upward and downward.

For example, in FIG. 8 the cavity 812a is the smallest in height, cavity 812b is larger, cavity 812c is larger, and cavity 812d is the largest. Thus, when the mobile plate 810 moves, plunger head 806a is moved first, then plunger head 806b, then plunger head 806c, and lastly plunger head 806d. Moving from left to right in FIG. 8, the mobile plate 810 is moved upward to cause the syringes 802 to draw in fluid and then the mobile plate 810 is moved downward to cause the syringes 802 to dispense fluid. The syringe pump system 800 may comprise an actuation device (not shown) to move the mobile plate 810 upward and downward. The actuation device may be controlled by a controller. The actuation device may for example comprise a stepper motor that is coupled to the mobile plate 810 via a threaded rod or other types of linear actuators.

In implementation, if all of the syringes 802 were the same size (e.g. 100 µL) and at a maximum upper position of the mobile plate 810 the engagements/spacers at a bottom of the plungers 808 were at 100/75/50/25, then syringe 802a would be filled with 100 µL, syringe 802b would have 75 µL, syringe 802c would have 50 µL, and syringe 802d would have 25 µL. Then, during a pumping cycle as the mobile plate 810 is moved downward, syringe 802a would immediately start to dispense fluid, at 75 µL syringe 802b would start, followed by syringe 802c at 50 µL, and then syringe 802d at 25 µL. This allows for a single motor such as a stepper motor to sequentially pump "n" number of syringes for performing standard additions.

Figure 9A:
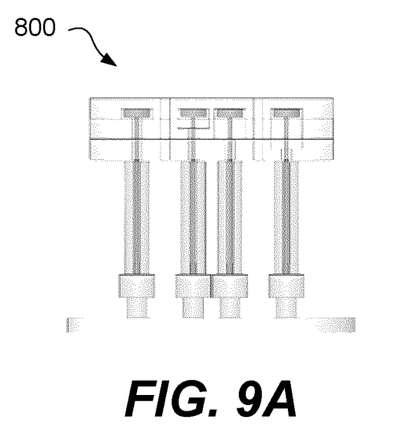
FIGS. 9A and 9B show operation of the syringe pump system in a dispensing state and a withdrawing state.
Figure 9B:
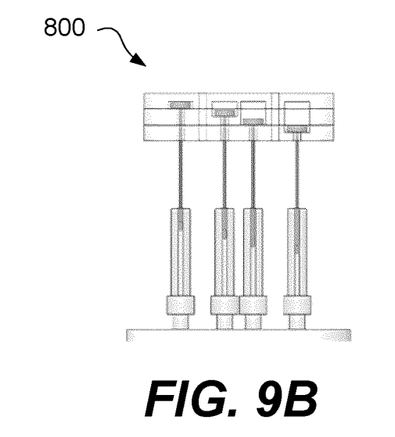

As further examples, FIGS. 9A and 9B show operation of the syringe pump system 800 in a fully dispensing state and a fully withdrawing state, respectively.

Figure 10:
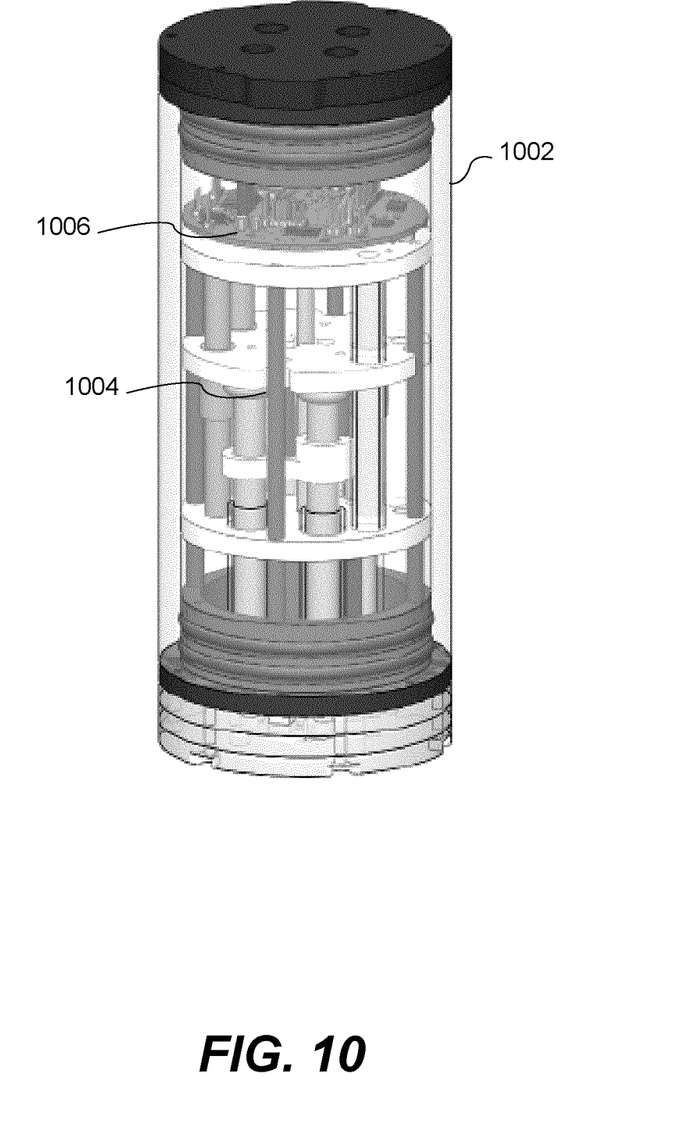
FIG. 10 shows an assembled view of the syringe pump system.

FIG. 10 shows an assembled view of the syringe pump system. The syringe pump system may be disposed within a container 1002 and comprise guide rods 1004 and bushings to stabilise the pump. A printed circuit board 1006 may be used to control the actuation device for moving the mobile plate. Permanent magnets and/or Hall effect sensors may be used to determine a vertical position of the mobile plate.

It would be appreciated by one of ordinary skill in the art that the system and components shown in Figures may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein. For example, dimensions may be modified/scaled depending on desired configurations. Additionally, other types of equipment/components may be used where applicable.

The invention claimed is:

1. A bi-directional microfluidic pump, comprising:
   first and second fluidic inlet channels;
   first and second fluidic outlet channels;
   a fluidic actuation channel fluidically coupling the first and second fluidic inlet channels and the first and second fluidic outlet channels;
   a check-valve disposed in each of the first fluidic inlet channel, the first fluidic outlet channel, the second fluidic inlet channel, and the second fluidic outlet channel; and
   a permanent magnet disposed within the fluidic actuation channel and configured to move within a region of the fluidic actuation channel between a first side proximate to the first fluidic inlet and outlet channels and a second side proximate to the second fluidic inlet and outlet channels.

2. The bi-directional microfluidic pump of claim 1, wherein the permanent magnet is actuated within the fluidic actuation channel by an external magnetic field.

3. The bi-directional microfluidic pump of claim 2, wherein the external magnetic field is generated using at least one of a solenoid and a rotating permanent magnet.

4. The bi-directional microfluidic pump of claim 1, wherein the first and second fluidic outlet channels combine to a fluidic outlet port.

5. The bi-directional microfluidic pump of claim 1, wherein the check-valves comprise one or more of: a ball valve, a flap valve, a plug valve, a cantilever valve, and a geometric valve.

6. The bi-directional microfluidic pump of claim 1, wherein each check-valve comprises:
   a valve fluidic channel having an inlet end and an outlet end;
   a gasket disposed within the valve fluidic channel; and
   a ferromagnetic metal ball adapted to engage with the gasket to seal against fluid flow when the valve is closed.

7. The bi-directional microfluidic pump of claim 6, wherein the valve fluidic channel comprises a first portion within which the metal ball moves, and a second portion between the first portion and the outlet end, wherein a diameter of the second portion of the fluidic channel is smaller than a diameter of the metal ball.

8. The bi-directional microfluidic pump of claim 7, wherein the second portion is offset from a cylindrical axis of the first portion of the fluidic channel.

9. The bi-directional microfluidic pump of claim 7, wherein the metal ball is between 0.01-2.0 mm in diameter.

10. The bi-directional microfluidic pump of claim 6, wherein the metal ball is made of stainless steel.

11. The bi-directional microfluidic pump of claim 6, wherein the metal ball comprises an exterior surface coating.

12. The bi-directional microfluidic pump of claim 6, wherein the gasket is an O-ring.

13. The bi-directional microfluidic pump of claim 1, wherein the permanent magnet comprises a surface coating.

14. A method of manufacturing a bi-directional microfluidic pump, comprising:
   cutting a plurality of fluidic channels into one or more layers of material to be bonded with one or more other layers of material for forming a microfluidic chip, the plurality of fluidic channels comprising first and second fluidic inlet channels, first and second fluidic outlet channels, and a fluidic actuation channel fluidically coupling the first and second fluidic inlet channels and the first and second fluidic outlet channels;
   installing a check-valve in each of the first and second fluidic inlet channels and the first and second fluidic outlet channels; and
   inserting a permanent magnet into the fluidic actuation channel.

15. The method of claim 14, further comprising disposing at least one of a solenoid and a rotating permanent magnet for generating a magnetic force to actuate the permanent magnet within the fluidic actuation channel.

16. The method of claim 14, wherein the material is polymethyl(methacrylate) (PMMA).

17. The method of claim 14, wherein the cutting is performed using a micromill or laser cutter.

18. The method of claim 14, wherein the check-valve is a ball-type check valve, and installing the check-valve in each of the first and second fluidic inlet channels and the first and second fluidic outlet channels comprises:
   placing a ferromagnetic metal ball into each of the first and second fluidic inlet channels and the first and second fluidic outlet channels;
   defining a groove in each of the first and second fluidic inlet channels and the first and second fluidic outlet channels for securing a gasket; and
   placing the gasket into each of the grooves.

19. The method of claim 18, wherein the gasket is an O-ring.

20. The method of claim 18, wherein the metal ball is made from stainless steel.

21. The method of claim 14, wherein the microfluidic chip comprises at least three layers of material, and wherein at least some of the plurality of fluidic channels are cut into a middle layer.

22. The method of claim 14, wherein the layers of material are solvent bonded using one or more of chloroform, heat, and pressure, to form the microfluidic chip.

* * * * *